Figure 1:
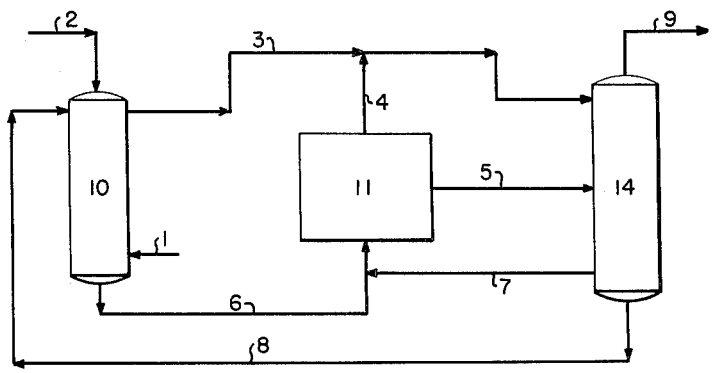

April 19, 1966

C. H. WORSHAM 3,247,084

ELECTROLYTIC PROCESS FOR CONVERTING
N-BUTENES TO METHYL ETHYL KETONE
Filed May 21, 1963

Charles H. Worsham    Inventor

By W. O. Heilman

Patent Attorney 3,247,084
ELECTROLYTIC PROCESS FOR CONVERTING N-BUTENES TO METHYL ETHYL KETONE
Charles H. Worsham, Fanwood, N.J., assignor to Esso Research and Engineering Company, a corporation of Delaware
Filed May 21, 1963, Ser. No. 281,875
6 Claims. (Cl. 204—80)

This application is a continuation-in-part of Serial No. 121,488 filed July 3, 1961.

This invention relates to a novel process for converting n-butenes to methyl ethyl ketone. In particular it relates to contacting n-butenes with sulfuric acid and converting such n-butenes to methyl ethyl ketone in a single step process utilizing electrochemical oxidation. More particularly it relates to a process wherein n-butenes are absorbed in aqueous sulfuric acid and converted in situ to methyl ethyl ketone by anodic oxidation.

Ketones are produced commercially by the catalytic dehydrogenation of secondary alcohols. Ordinarily the secondary alcohol feed stock is produced by sulfuric acid hydration of the corresponding olefin. Thus when the ketone is derived from an olefin, two separate processes with intermediate product reactions are required. In the first process, that is for the alcohol production from the olefin, the olefin is absorbed into a concentrated sulfuric acid solution resulting in the formation of an organic sulfate, which in turn is hydrolyzed to the secondary alcohol. The alcohol is then separated from the acid solution and purified by conventional separation techniques usually involving a series of distillation and caustic washings. In a second process, that is for the production of a ketone from the alcohol, a highly refined alcohol is passed in vapor phase over a solid catalyst at elevated temperatures in the range of about 650–900° F. to dehydrogenate the hydrogen feed stock to the ketone. The crude ketone is then subjected to a number of product recovery steps. The two step ketone process of the type described is well known and is exemplified by the process for producing secondary butyl alcohol from n-butenes disclosed in U.S. Patent 2,514,291 and the process for converting secondary butyl alcohol to methyl ethyl ketone in U.S. Patent 2,835,706.

The problem inherent in the conventional two stage production of ketones includes the necessity for separation, recovery and generation of both intermediate products, the duplication of process apparatus and equipment, and the need for large scale acid reconcentration.

It has now been discovered that methyl ethyl ketone, hereinafter called MEK, can be selectively produced from the n-butenes by contacting the n-butenes with aqueous sulfuric acid and subjecting the resulting solution comprising aqueous sulfuric acid and n-butenes to anodic oxidation.

The conversion of olefins to ketones by electrolytic oxidation is known in the art. Such processes include the process hereinbefore set forth which comprises absorbing the olefin in 85–90 wt. percent sulfuric acid, hydrolyzing the sulfated product obtained to the alcohol, purifying the alcohol and subjecting the purified alcohol to anodic oxidation. Another method known in the art is one such as set forth in U.S. Patent 1,365,053 which discloses a process of producing ketones from olefins by absorbing the olefin in highly concentrated sulfuric acid such as 98 wt. percent sulfuric or fuming sulfuric to produce a sulfated material and then exposing the sulfated material to electrolytic oxygen, especially oxygen in a nascent condition to afford a product consisting of ketones and fatty acids.

The anodic oxidation step of the instant process may be carried out in either a fuel cell type electrochemical reactor with the simultaneous generation of electrical energy or in an electrolytic cell or reactor with a net consumption of electrical energy which must be supplied from an external source. In both types of reactors the organic feed stock which is to be oxidized is brought into dual contact with an aqueous sulfuric acid electrolyte and an anode of the cell. In the fuel cell, the reaction is initiated by the admixing of an oxidizing gas into dual contact with the cathode and the electrolyte which results in a catalyzed reduction of an oxidizing gas and the formation of water thereafter from hydrogen ions in the electrolyte. Conducting means are provided between anodes and cathodes external to the electrolyte providing a net flow of electrons to the cathode after the reaction is initiated. In the anodic oxidation of n-butenes hydrogen ions are evolved at the anode. In the electrolytic cell the reaction differs in that it is initiated by admitting a direct current to the electrodes of the cell (without admixing of an oxidizing gas).

The cells employed herein may be referred to as an electrochemical cell, it being understood such term defines a class of cells which include both a power generating fuel cell and a power consuming hydrogen evolving electrolytic cell.

It has now been discovered that MEK can be produced from n-butenes by absorbing the n-butenes in about 65 wt. percent sulfuric acid at a temperature of about 142° F., passing the acid extract into a fuel cell or an anodic oxidation reactor wherein MEK is produced by anodic oxidation. Thereafter the MEK is separated from the acid and the acid is then recycled without any need for reconcentration to absorb the n-butenes to complete the cycle.

It is one object of this invention to provide a highly selective process wherein a n-butene is contacted with an aqueous sulfuric acid solution, the acid solution is then employed as the electrolyte of an electrochemical cell and the absorbed n-butene is anodically oxidized to MEK.

It is another object of this invention to provide a process whereby n-butenes may be converted to MEK in a single step process without the necessity of reconcentrating the aqueous sulfuric acid.

It is a further object of this invention to provide a process for the simultaneous production of MEK and pure hydrogen gas in electrochemical cells from n-butenes which are absorbed in aqueous sulfuric acid.

It is a further object of this invention to provide a more economic and selective process for the simultaneous production of MEK and pure hydrogen gas in serially staged electrochemical cells from n-butenes which have been absorbed in aqueous sulfuric acid.

In order to make the conversion of n-butenes to MEK economical, high current densities such as from 150–300 amps./sq. ft. need be maintained. It has been found that current densities may be maintained at high levels by staging the cells serially and increasing the voltage from about 0.9 to about 1.4 in successive cells. The operation of a fuel cell at a voltage sufficiently high to maintain a current density that would be economical is limited by three factors. The factors limiting the optimum cell performance are:

(1) There is a voltage above which any increase does not bring about a corresponding increase in the current density in the cell.

(2) High voltages entail the use of more current rectification which increases the cost.

(3) High voltages entail a loss of selectivity to product formation.

By arranging 2 to 5, preferably 3 or 4 cells, in series and increasing the voltage successively from about 0.9 to about 1.4, 80 to 95% conversion of n-butenes to MEK can be accomplished at an effective over-all voltage of about 1.1 volts. To accomplish the same purpose in a single cell, a voltage of about 1.5 would have to be maintained. This higher voltage would greatly add to the cost.

It has also been found that the conversion of n-butenes to MEK can be economically and efficiently accomplished by using serially staged cells, cells connected so that the n-butenes are fed from one cell to the other, wherein the voltage is held constant and the current density is reduced from cell to cell in a series of cells. This method of staging the cells and changing the current density allows for the use of lower voltages than is required when a single cell is used. By current staging the first cell would be operated at the highest current density, i.e., a current density of about 120 to 80 amps./sq. ft. and the last cell in the series would be operated at the lowest current density, i.e., a current density of about 18 to 10 amps./sq. ft. The cells intermediate to the first and last cell in the series would be operated at current densities between the highest and lowest depending upon the number of cells used. It is preferred to use 2 to 5 cells connected in series when practicing this invention. The voltage would be held constant in each of the cells. A voltage in the range of about 0.9 to about 1.2 is preferred. The utilization of current staging allows for the use of lower voltages than could be maintained when using a single cell. Thus, current staging results in a power savings in the case of carrying out the process in a single cell coupled with a high efficiency of about 80 to 95% conversion of n-butenes to MEK.

These and other advantages of the invention will become apparent from the following description and drawings.

Referring to FIGURE 1, a refinery stream containing a mixture of $C_4$ hydrocarbons is passed via conduit 1 to n-butene extractor 10. This stream should ordinarily comprise essentially n-butenes and n-butane. As a $C_4$ stream from a bubble plate tower is utilized as the feed for this reaction, the acetylenes and butadienes should first be removed by the conventional ammoniacal cuprous acetate, extraction, then the isobutylene is extracted by using conventional sulfuric acid extraction. Isobutylenes can be extracted by absorbing the isobutylene in 65 wt. percent sulfuric acid at about 70 to 110° F. The remaining $C_4$ stream from the bubble plate tower will contain essentially n-butenes and n-butane. This stream of n-butenes and n-butane is passed into n-butene extractor 10. The n-butenes are absorbed in sulfuric acid, removed from extractor 10 and transmitted via conduit 6 and passed to electrochemical cell 11 wherein MEK is produced by anodic oxidation. The MEK-sulfuric acid mixture is then removed from cell 11 via conduit 5 and passed to MEK recovery unit 14. The n-butene is removed from extractor 10 via conduit 3 and passed to recovery unit 14. The hydrogen formed in the anodic oxidation of n-butenes to MEK, in a power driven cell, is removed from cell 11 via conduit 4 to conduit 3 and thereby passed into recovery unit 14. The n-butane hydrogen mixture is used to strip the MEK from the sulfuric acid. Unreacted n-butenes are recycled from unit 14 via conduit 7 to cell 11. The sulfuric acid from which the MEK has been removed by gas stripping, is removed via conduit 8 and passed back into the absorber 10. Water as needed may be added to absorber 10 via conduit 2. The sulfuric acid used in this reaction will be about 60 to 70 wt. percent, preferably 63 to 68 wt. percent and most commonly about 65 wt. percent, to extract the n-butenes from absorber 10. The absorption of n-butenes from the sulfuric acid is preferably carried out at a temperature from about 140 to 145° F., preferably 142° F.

Figure 2:
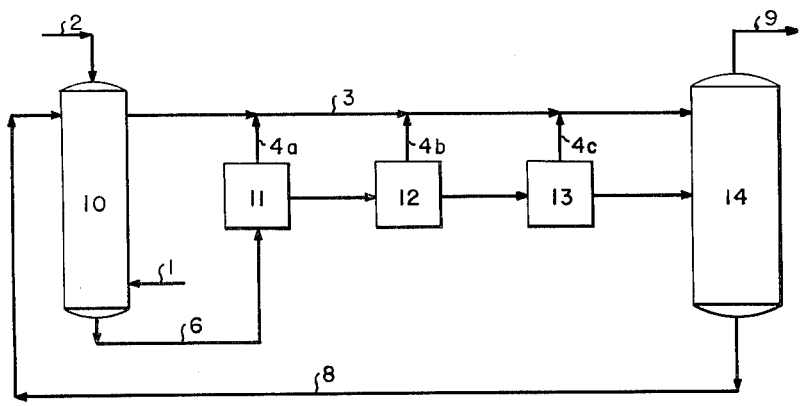

Referring to FIGURE 2, a refinery stream containing a mixture of $C_4$ hydrocarbons is passed via conduit 1 to n-butene extractor 10. This stream comprises essentially n-butenes and n-butane. The $C_4$ stream from a bubble plate tower can be utilized as the feed for this reactor if the butadienes and isobutylenes are first removed. The butadienes are first removed by the conventional acetylene extraction process. The isobutylene is next extracted by using the conventional sulfuric acid extraction, i.e., absorbing the isobutylene in 65 wt. percent sulfuric acid at about 70–110° F. The remaining $C_4$ hydrocarbon stream from the bubble plate tower will contain essentially n-butenes and n-butane. This stream of n-butenes and n-butane is passed into n-butene extractor 10 via conduit 1. The n-butenes are absorbed in 65 wt. percent sulfuric acid at a temperature of about 140–145° F. The n-butenes are extracted from extractor 10 via conduit 3. The n-butene sulfuric acid mixture is removed from extractor 10 via conduit 6 and passed to a series of electrochemical cells wherein each cell operates at a slightly higher voltage than the previous cell. From 2–5 cells may be utilized to effect about a 90% conversion of the reactant to MEK. The first cell will normally be operated at about 0.9 volt with a current density of about 150–300 amps./sq. ft. Approximately 20% conversion is accomplished in the first cell. The acid-fuel-MEK mixture is then passed to the second cell at a slightly higher voltages where more of the fuel is oxidized to MEK. The MEK-fuel-sulfuric acid mixture is then passed on to the successive cells to effect the oxidation step-wise up to about 90% oxidation of the fuel to MEK. In the drawing, three such staged cells, 11, 12 and 13, are shown. In each of the cells during the oxidation of reaction to MEK, hydrogen is produced which is drawn from cells via conduits 4a, 4b and 4c. The sulfuric acid-MEK mixture is then removed from the last electrolytic cell via conduit 5 and passed to MEK recovery unit 14. The n-butane is removed from extractor 10 via conduit 3 and passed to recovery unit 14. The hydrogen formed in the anodic oxidation and the reactants to MEK is removed from each of the cells via conduits 4a, 4b and 4c and passed to conduit 3 and thereby passed into recovery unit 14. The n-butane-hydrogen mixture is then used to strip the MEK from the sulfuric acid mixture. The n-butane-hydrogen-MEK mixture is removed from the recovery unit via conduit 9. The MEK, n-butane and hydrogen can then be separated and collected separately. The sulfuric acid from which the MEK has been removed by gas stripping is removed from recovery unit 14 via conduit 8 and passed back into absorber 10 without reconcentration. Water as needed may be added to absorber 10 via conduit 2. The sulfuric acid used in this reactor will be about 60–70 wt. percent, preferably 63–68 wt. percent, and most commonly at about 65 wt. percent to extract the n-butenes from the absorber and for use as the electrolyte in the electrochemical cell.

Product recovery unit 14 may comprise singly or in combination, any of the conventional liquid vapor or liquid separation processes, namely distillation and extraction. This invention is not restricted to the employment of any particular product separation method, however, the preferred embodiment is to use the n-butene and hydrogen gas to strip the MEK from the acid. When the process of this invention is carried out in an electrolytic cell that consumes electrical energy from an outside energy source, the electrical energy supplied is controlled so as to be insufficient to initiate the formation of nascent oxygen. The cell should not exceed a potential of about 1.65 volts or slightly higher, depending upon the acid concentration of the electrolyte. The process at the anode is ordinarily carried out in the range of about 0.5 to 1.0 volt anodic to standard hydrogen reference.

The fuels that may be used in the production of MEK include butene-1, trans-butene-2 and cis-butene-2.

In a power consuming cell hydrogen is produced at the cathode. This hydrogen is very pure and may be collected as such or it may be recycled to the MEK recovery unit for stripping the MEK from the acid solution by virtue of the partial pressure of the desired product and then collected as pure hydrogen. In the process for oxidation of n-butenes to MEK, the ketone concentration has been found to be effective in concentrations up to 22% without harm to performance. Higher concentrations are possibly given favorable partial pressures for gas stripping. In addition to hydrogen produced in the process of anodically oxidizing n-butenes to MEK, n-butane or other inert gases may be used to strip the MEK from the acid. The hydrogen after being used for stripping may be collected as pure hydrogen or used as the fuel for a power producing fuel cell. The power from such fuel cell could be used to furnish the electrical energy required for operating a power driven electrochemical cell.

It is necessary in the operation of this invention that the acid concentration be maintained at about 63–68 wt. percent. When the acid concentration goes above about 70 wt. percent there is produced polymers and ethers in large quantities and alkyl sulfates by the reaction between the sulfuric acid and the n-butenes. If the acid concentration is below about 60 wt. percent the absorption rate of n-butenes in the acid is extremely slow. In order to obtain the maximum absorption the temperature of the absorption step must be maintained between 140–145° F. As the temperature of the absorption step increases the concentration of acid at which the polymerization ethers and sulfates form is reduced. As the temperature is lowered the absorption efficiency of the n-butenes in the acid is lowered. Therefore the conditions necessary for the practice of this invention requires that the n-butenes be absorbed in about 63–68 wt. percent sulfuric acid at a temperature of about 140–145° F. and a pressure of about 100–120 p.s.i.g. These conditions remain constant even when different ratios of acid to n-butenes volumes are used for the absorption step.

This invention will be more fully understood from the following examples which are for the purpose of illustration only and should not be construed as limitations upon the scope of the invention as set forth in the claims.

*Example 1*

Employing a processing unit in accordance with the flow diagram of FIGURE 1, MEK is produced by extracting n-butylenes with 65 wt. percent sulfuric acid at 140° F. and at a pressure of 110 p.s.i.g. from a hydrocarbon stream. The sulfuric acid n-butylene mixture is passed directly to an electrochemical reactor to convert the n-butylenes to MEK. The MEK sulfuric acid mixture is passed to a recovery unit wherein the MEK is stripped from the sulfuric acid by means of the n-butane stream from the butene absorber unit. The sulfuric acid is recycled from the recovery unit back to the absorbing unit without reconcentration. The temperature during the anodic oxidation in the electrolytic cell is about 180° F. The acid concentration remains at about 65 wt. percent.

*Example 2*

Employing a processing unit in accordance with the flow diagram of FIGURE 2, MEK is produced by extracting n-butylenes with 65 wt. percent sulfuric acid at 140° F. and at a pressure of 110 p.s.i.g. of a hydrocarbon stream. The extract is passed directly to the first of three electrochemical reactors connected so that the extract flows in succession from one reactor to the others. The extract is partially oxidized in each successive cell. The MEK-extract is passed from the last of the reactors to recovery unit wherein MEK is stripped from the sulfuric acid by means of the hydrogen formed during the oxidation of the extract to produce MEK. The sulfuric acid is recycled from the recovery unit back to the absorbing unit without reconcentration. The temperature during the anodic oxidation in electrolytic reactors is maintained at about 180° F. The acid concentration remains at about 65 wt. percent. A voltage of 0.9 is maintained at the first cell. A voltage of 1.2 is maintained at the second cell and a voltage of 1.4 is maintained at the third cell. The production of MEK based on the amount of n-butenes was 92%.

*Example 3*

A processing unit for the production of MEK from n-butenes was set up. The unit comprises an absorption unit for the absorption of n-butenes from the sulfuric acid from the hydrocarbon stream, five electrolytic reactors connected so that the extract from the absorption unit would flow serially through the reactors, and a recovery unit for the extraction of the MEK from the sulfuric acid. The cells were driven with direct current. The current density of the first cell was maintained at about 120 amps./sq. ft. The current densities in the successive cells were maintained at 88, 58, 33 and 18 amps./sq. ft. The 65 wt. percent sulfuric acid was used to absorb the n-butenes in the absorber unit at a temperature of about 140° F. Extract was fed into the first of the serially connected cells. Extract was oxidized to MEK in each successive cell. The MEK and acid were removed from the last reactor and fed into the recovery unit. Hydrogen produced during the oxidation of the extract to MEK was removed from the reactors and fed into the recovery unit and used as a stripping gas to remove the MEK from the acid. The hydrogen-MEK mixture was then separated to give pure hydrogen and MEK. The acid was recycled from the recovery unit back to the absorption unit without the necessity of reconcentration. The conversion of n-butenes to MEK was 87%.

What is claimed is:

1. A continuous process for selectively preparing methyl ethyl ketone comprising the steps of:
   (a) absorbing n-butenes from a normal hydrocarbon stream into 60 to 70 wt. percent sulfuric acid at a temperature in the range of about 140 to 145° F. and a pressure of about 100 to 120 p.s.i.g.;
   (b) anodically oxidizing the mixture resulting from the absorption step in an electrolytic cell under conditions controlled so as to prevent the formation of nascent oxygen, thereby preparing methyl ethyl ketone;
   (c) recovering the methyl ethyl ketone from the anodically oxidized mixture;
   (d) recycling the 60 to 70 wt. percent sulfuric acid to the absorbing step.

2. A process as in claim 1 wherein said normal hydrocarbon stream comprises essentially a mixture of n-butenes and n-butane.

3. A continuous process for selectively preparing methyl ethyl ketone comprising the steps of:
   (a) absorbing n-butenes from a normal hydrocarbon stream mixture comprising n-butene and n-butane into 65 wt. percent sulfuric acid at a temperature of 142° F. and a pressure of about 110 p.s.i.g.;
   (b) anodically oxidizing the absorption mixture in an electrolytic cell maintained at a potential not exceeding about 1.65 volts, thereby preparing methyl ethyl ketone;
   (c) recovering the methyl ethyl ketone from the anodically oxidized mixture;
   (d) recycling the 65 wt. percent sulfuric acid to the absorbing step.

4. A continuous process for selectively preparing methyl ethyl ketone comprising the steps of:
   (a) absorbing n-butenes from a normal hydrocarbon stream into 60 to 70 wt. percent sulfuric acid at a temperature in the range of about 140 to 145° F. and a pressure of about 100 to 120 p.s.i.g.;
   (b) anodically oxidizing the mixture resulting from the absorption step in a series of electrolytic cells, said series consisting of 2 to 5 cells under conditions controlled so as to prevent the formation of nascent oxygen;

(c) recovering the methyl ethyl ketone from the anodically oxidized mixture;

(d) recycling the 60 to 70 wt. percent sulfuric acid to the absorbing step.

5. A process as in claim 4 wherein the electrolytic cells are each maintained at a constant voltage in the range of about 0.9 to about 1.2 volts.

6. A process as in claim 4 wherein the voltage of each of the electrolytic cells is increased from about 0.9 to about 1.4 in the successive cells.

References Cited by the Examiner
UNITED STATES PATENTS 1,365,053  1/1921  Ellis et al. _____ 204—80

JOHN H. MACK, *Primary Examiner.*